(12) United States Patent
Viitala et al.

(10) Patent No.: US 12,197,220 B2
(45) Date of Patent: Jan. 14, 2025

(54) SELECTING A ROUTE

(71) Applicant: SANDVIK MINING AND CONSTRUCTION OY, Tampere (FI)

(72) Inventors: Janne Viitala, Tampere (FI); Severi Eerola, Tampere (FI); Mika Selin, Tampere (FI); Heikki Tapola, Tampere (FI); Petri Suomi, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 261 days.

(21) Appl. No.: 17/924,775

(22) PCT Filed: May 12, 2021

(86) PCT No.: PCT/EP2021/062738
§ 371 (c)(1),
(2) Date: Nov. 11, 2022

(87) PCT Pub. No.: WO2021/229007
PCT Pub. Date: Nov. 18, 2021

(65) Prior Publication Data
US 2023/0195120 A1  Jun. 22, 2023

(30) Foreign Application Priority Data
May 13, 2020  (EP) .................................. 20174459

(51) Int. Cl.
*E21B 7/02* (2006.01)
*G05D 1/00* (2006.01)

(52) U.S. Cl.
CPC ............. *G05D 1/0212* (2013.01); *E21B 7/02* (2013.01)

(58) Field of Classification Search
CPC ................................ G05D 1/0212; E21B 7/02
See application file for complete search history.

(56) References Cited

U.S. PATENT DOCUMENTS

| 7,931,096 B2* | 4/2011 | Saha ....................... E21B 7/022 340/853.2 |
| 9,164,510 B2 | 10/2015 | Mian et al. |
| 2017/0101860 A1* | 4/2017 | Nieminen ............... E21B 7/025 |
| 2019/0369620 A1 | 12/2019 | Zhou et al. |
| 2020/0308914 A1* | 10/2020 | Haverinen ............... E21B 7/024 |

FOREIGN PATENT DOCUMENTS

| GB | 2577290 A | 3/2020 |
| WO | 2014186822 A1 | 11/2014 |

\* cited by examiner

*Primary Examiner* — Ramsey Refai
(74) *Attorney, Agent, or Firm* — Corinne R. Gorski

(57) ABSTRACT

An apparatus, method and computer program product arranged for receiving information on a target position of a drilling rig, receiving status information relating to the drilling rig, calculating, based on the status information, at least a first route according to a first approach type and a second route according to a second approach type to the target position, and selecting, based on at least one criterion, the calculated first route or the calculated second route.

15 Claims, 3 Drawing Sheets

SELECTING A ROUTE

RELATED APPLICATION DATA

This application is a § 371 National Stage Application of PCT International Application No. PCT/EP2021/062738 filed May 12, 2021 claiming priority to EP 20174459.6 filed May 13, 2020.

TECHNICAL FIELD

The present application relates generally to selecting a route. More specifically, the present application relates to selecting a route based on at least one criterion.

BACKGROUND

Drilling rigs are used for drilling holes in different kinds of circumstances.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving information on a target position of a drilling rig, receiving status information relating to the drilling rig, calculating, based on the status information, at least a first route according to a first approach type and a second route according to a second approach type to the target position, and selecting, based on at least one criterion, the calculated first route or the calculated second route.

According to a second aspect of the invention, there is provided a method comprising: receiving information on a target position of a drilling rig, receiving status information relating to the drilling rig, calculating, based on the status information, at least a first route according to a first approach type and a second route according to a second approach type to the target position, and selecting, based on at least one criterion, the calculated first route or the calculated second route.

According to a third aspect of the invention, there is provided a computer program comprising instructions for causing an apparatus to perform at least the following: receiving information on a target position of a drilling rig, receiving status information relating to the drilling rig, calculating, based on the status information, at least a first route according to a first approach type and a second route according to a second approach type to the target position, and selecting, based on at least one criterion, the calculated first route or the calculated second route.

According to a fourth aspect of the invention, there is provided an apparatus comprising at least one processor and at least one memory including computer program code, the at least one memory and the computer program code configured to with the at least one processor, cause the apparatus at least to: receive information on a target position of a drilling rig, receive status information relating to the drilling rig, calculate, based on the status information, at least a first route according to a first approach type and a second route according to a second approach type to the target position, and select, based on at least one criterion, the calculated first route or the calculated second route.

According to a fifth aspect of the invention, there is provided a non-transitory computer readable medium comprising program instructions for causing an apparatus to perform at least the following: receiving information on a target position of a drilling rig, receiving status information relating to the drilling rig, calculating, based on the status information, at least a first route according to a first approach type and a second route according to a second approach type to the target position, and selecting, based on at least one criterion, the calculated first route or the calculated second route.

According to a sixth aspect of the invention, there is provided a computer readable medium comprising program instructions for causing an apparatus to perform at least the following: receiving information on a target position of a drilling rig, receiving status information relating to the drilling rig, calculating, based on the status information, at least a first route according to a first approach type and a second route according to a second approach type to the target position, and selecting, based on at least one criterion, the calculated first route or the calculated second route.

BRIEF DESCRIPTION OF THE DRAWINGS

Some example embodiments will now be described with reference to the accompanying drawings.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to route planning. More particularly, example embodiments relate to route planning for a drilling rig. An example embodiment relates to an apparatus configured to receive information on a target position of a drilling rig, receive status information relating to the drilling rig, calculate, based on the status information, at least a first route according to a first approach type and a second route according to a second approach type to the target position, and select, based on at least one criterion, the calculated first route or the calculated second route.

Figure 1:
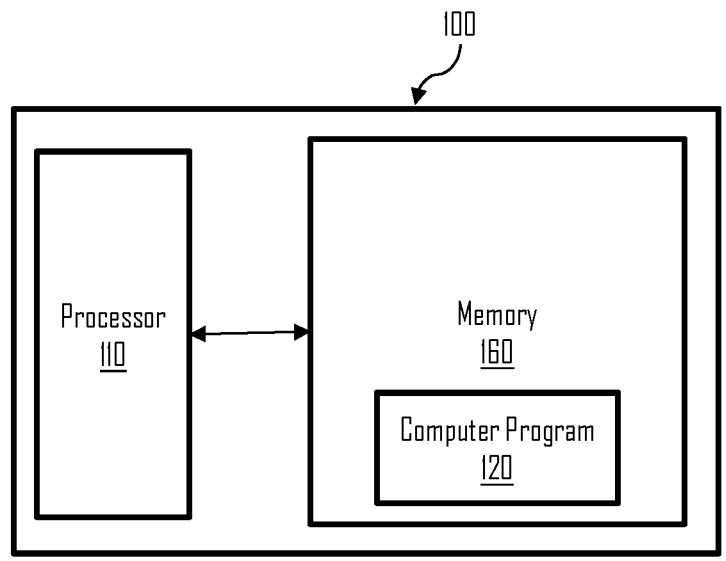
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may be, for example, an electronic device such as a module comprised by an automation or control system, a chip or a chipset. The apparatus 100 comprises one or more control circuitry, such as at least one processor 110 and at least one memory 160, including one or more algorithms such as computer program instructions 120 wherein the at least one memory 160 and the computer program instructions are configured, with the at least one processor 110 to cause the apparatus to carry out any of example functionalities described below.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The at least one memory 160 stores computer program instructions 120 which when loaded into the processor 110 control the operation of the apparatus 100 as explained below. In other examples, the apparatus 100 may comprise more than one memory 160 or different kinds of storage devices.

Computer program instructions 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a USB stick, a Compact Disc (CD), a Compact Disc Read-Only Memory (CD-ROM), a Digital Versatile Disk (DVD) or a Blu-ray disk.

Figure 2:
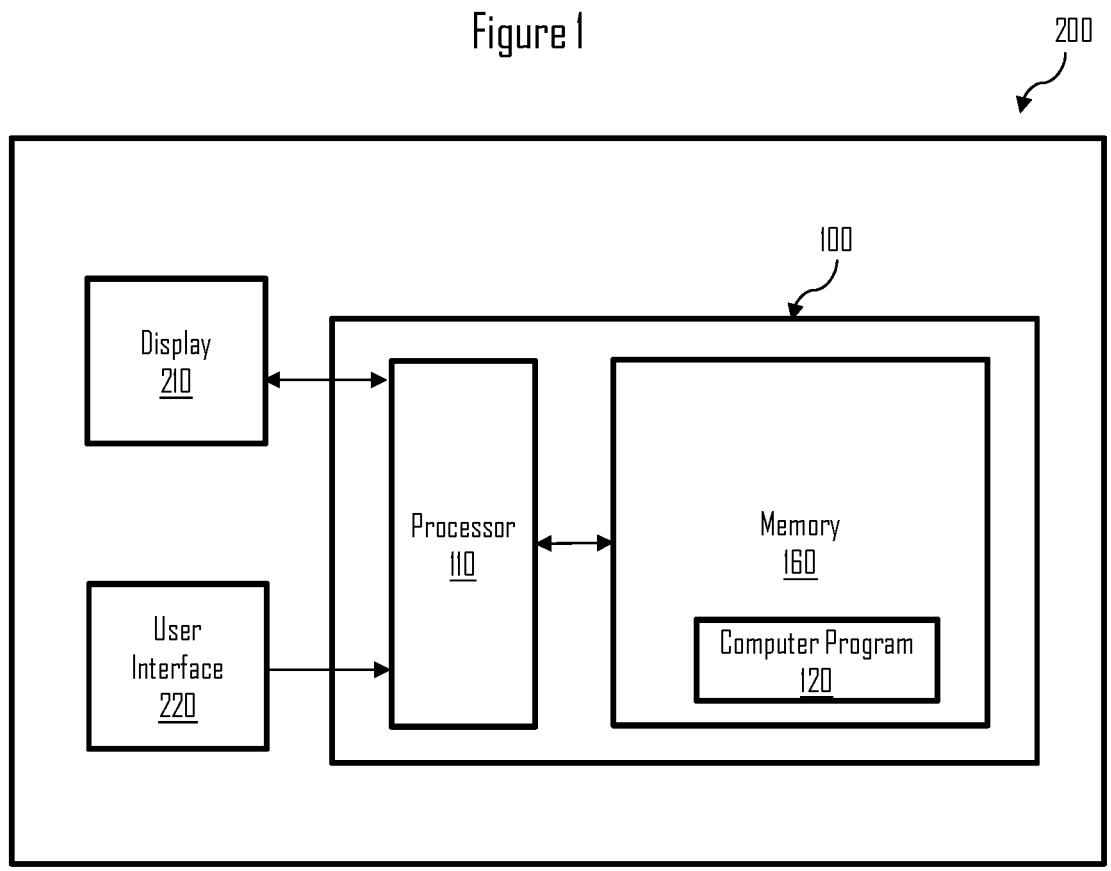
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a module comprised by an automation system or a control system, a Personal Computer (PC), a laptop, a desktop, a wireless terminal, a communication terminal, a computing device or the like. In the examples below it is assumed that the apparatus 200 is a computing device.

In the example embodiment of FIG. 2, the apparatus 200 is illustrated as comprising the apparatus 100, a display 210 and a user interface 220 for interacting with the computing device 200. The display 210 may also be configured to act as a user interface. For example, the display may be a touch screen display. In an example embodiment, the display 210 and/or the user interface 220 may be external to the apparatus 200, but in communication with it.

Additionally or alternatively, the user interface may also comprise a manually operable control such as a button, a key, a touch pad, a joystick, a stylus, a pen, a roller, a rocker, a keypad, a keyboard or any suitable input mechanism for inputting and/or accessing information.

The apparatus 200 of the example of FIG. 2 may also be configured to establish radio communication with another device using, for example, a cellular network, a Bluetooth or WiFi connection or the like.

The apparatus 200 may be implemented in the drilling rig or the apparatus 200 may be a module operatively connected to the drilling rig. For example, the apparatus 200 may be configured to communicate with the drilling rig via a wireless connection.

According to an example embodiment, the drilling rig is configured to drive at least in a first direction and a second direction. According to an example embodiment, the first direction is different from the second direction. For example, the first direction may comprise driving forward and the second direction may comprise driving backward. According an example embodiment, a first direction comprises driving a drilling rig with a first machine heading and a second direction comprises driving the drilling rig with a second machine heading.

According to an example embodiment, the first approach type comprises approaching the target position by driving the drilling rig forward and the second approach type comprises approaching the target position by driving the drilling rig backward.

A drilling rig may comprise, for example, a surface drilling rig such as a surface top hammer drill rig, a surface down-the-hole drill rig, a dimensional stone drill rig, or a rotary blasthole drill rig. A drilling rig may be used for exploration drilling such as identifying a location and quality of a mineral, for production drilling such as mining and/or for pre-splitting. A drilling rig may comprise a drilling rig controlled by a driver or an operator, or an autonomous drilling rig enabling remote use or a semi-automatic drilling rig enabling remote use and/or local use.

According to an example embodiment, the apparatus 200 is configured to receive information on a target position of a drilling rig. A target position may comprise a physical location of a drilling rig. A physical location may comprise an absolute location such as a location corresponding to geographical coordinate values or a relative location such as a location relative to, for example, a drilling site.

A target position may comprise a position relating to operating the drilling rig or performing an operation using the drilling rig. According to an example embodiment, the target position comprises a position of a target hole to be drilled. A target position such as a target hole to be drilled may be defined, for example, using X and Y coordinates with respect to a defined reference point. As another example, a target position may be defined using X, Y and Z coordinates such that also altitude is taken into account.

Information on a target position may be received, for example, from a drill plan. A drill plan comprises drill hole data on a plurality of drill holes to be drilled at a drilling site. A drilling site comprises a drilling area comprising a plurality target holes. Drill hole data may comprise different kinds of data. For example, drill hole data may comprise position data such as geographical coordinates for one or more holes to be drilled, characteristic data such as drill depth, drilling order, hole dimensions such as a diameter of a hole, and/or the like. According to an example embodiment, a drill plan comprises a digital drill plan.

As mentioned above, according to an example embodiment, the apparatus 200 comprises the apparatus 100. For example, the apparatus 100 and the apparatus 200 may be integrated such that they form a single unit.

The apparatus 200 may be configured to receive information on a target position from a user or from another device. According to an example embodiment, the apparatus 200 is configured to receive information on a target position in response to a user input or in response to determining a target position based on a drill plan. A user input may be provided, for example, on a touch screen of the apparatus 200 or of a separate device operatively connected to the apparatus 200. A user input may comprise, for example, a touch gesture on a touch screen.

According to an example embodiment, the apparatus 200 is further configured to receive status information relating to the drilling rig. Status information relating to the drilling rig may comprise information relating to the drilling rig, information relating to a working area of a drilling rig, physical characteristics of the drilling rig, a characteristic or a property of the drilling rig, or the like. For example, information relating to the drilling rig may comprise information on a status of the drilling rig at a particular point in time such as a current status of the drilling rig.

According to an example embodiment, the status information relating to the drilling rig comprises at least one of the following: a position of the drilling rig, a heading of the drilling rig, a drilling area or a combination thereof. A position of the drilling rig may comprise an absolute position or a relative position.

A heading of the drilling rig comprises machine heading, for example, comprising information on to which direction the drilling rig is headed. A heading may comprise information on to which direction the drilling rig is headed with respect to the target position. A heading may be defined with respect to a reference point, such as the target position or a compass point such as north, south, east or west.

A drilling area may comprise a geographical area. The geographical area may be limited by virtual boundaries. According to an example embodiment, a drilling area comprises a geo-fence that comprises a virtual perimeter corresponding to a real-world geographic area.

According to an example embodiment, the apparatus 200 is configured to receive information on a position of the drilling rig. A position of the drilling rig may comprise an absolute position or a relative position. An absolute position may comprise, for example, geographical coordinates such as global positioning system (GPS) coordinates, global navigation satellite system coordinates (GNSS) or the like. A relative position may comprise, for example, a position of the drilling rig with respect to a determined drill site. The apparatus 200 may be configured to receive a position of the drilling rig from a separate device or service, or the apparatus 200 may be configured to determine the position of the drilling rig. According to an example embodiment, the position of the drilling rig comprises a dynamic position. In other words, information on the position of the drilling rig may be updated in response to movement of the drilling rig. Information on the position of the drilling rig may be updated continuously, at pre-determined time intervals, or the like.

According to an example embodiment, the apparatus 200 is configured to determine at least one route to a target position for a drilling rig. A route to a target position may comprise a path to be followed by the drilling rig to the target position.

The apparatus 200 may be configured to determine the at least one route to the target position automatically. For example, the apparatus 200 may be configured to generate the at least one route using artificial intelligence (AI) based on a drill plan. As another example, the apparatus 200 may be configured to generate the at least one route based on information input by a user.

According to an example embodiment, the apparatus 200 is further configured to calculate, based on the status information, at least a first route according to a first approach type and a second route according to a second approach type to the target position. The apparatus 200 may be configured to calculate the at least a first route and the second route based on a position of the drilling rig, the target position and the status information.

An approach type comprises information on how the drilling rig approaches the target position such as a hole to be drilled. According to an example embodiment, an approach type comprises a driving direction. According to another example embodiment, an approach type comprises an approach heading. An approach heading may comprise a machine heading when approaching the target position. An approach type may further comprise information on driving speed and/or other information relating to approaching a target position.

A drilling rig may be configured to drive at least in a first direction and a second direction.

According to an example embodiment, the first approach type comprises approaching the target position by driving the drilling rig in a first direction. The first direction may comprise, for example, driving the drilling rig forward. According to another example embodiment, the first approach type comprises approaching the target position by driving the drilling rig in a second direction. The second direction may comprise, for example, driving the drilling rig backward.

According to an example embodiment, the second approach type comprises approaching the target position by driving the drilling rig in a second direction. The first direction may comprise, for example, driving the drilling rig backward. According to another example embodiment, the second approach type comprises approaching the target position by driving the drilling rig in a first direction. The first direction may comprise, for example, driving the drilling rig forward.

According to an example embodiment, the second approach type is different from the first approach type.

According to an example embodiment, the apparatus 200 is configured to use the status information for limiting calculating the first route and the second route. For example, the status information may define a drilling area within which the drilling rig is allowed to drive, or the status information may comprise a heading of the drilling rig thereby limiting the calculation. As another example, the status information may comprise one or more physical capabilities of the drilling rig such as a turning radius.

According to an example embodiment, the apparatus 200 is further configured to receive information for calculating the first route and the second route. According to an example embodiment, the apparatus 200 is configured to receive at least one user input for calculating the first route and the second route. The user input may define, for example, an approach angle for approaching the target position.

According to an example embodiment, an approach angle comprises an angle of the drilling rig with respect to a reference point. The reference point may comprise, for example, a GPS reference point. For example, assuming the drilling rig approaches the target position such that the approach angle is zero, the drilling rig approaches the target position such that the drilling rig drives towards the reference point.

According to an example embodiment, the apparatus 200 is configured to receive information on a desired approach angle for approaching the target position. According to an example embodiment, the apparatus 200 is configured to calculate the first route and the second route in dependence upon the desired approach angle.

According to an example embodiment, the apparatus 200 is configured to set a waypoint that is to be included in the calculated first route and the calculated second route. According to an example embodiment, the apparatus 200 is configured to set a plurality of waypoints that are to be included in the calculated first route and the calculated second route.

A waypoint comprises an intermediate point on route via which the drilling rig is instructed to drive. A waypoint may be added to the drill plan in response to a user input, for example. Therefore, the user may affect the calculation by, for example, instructing the apparatus 200 to add predetermined points to the drill plan.

Without limiting the scope of the claims, an advantage of a waypoint is that, for example, using a waypoint a route of the drilling rig may be determined such that obstacles, fixed infrastructure and/or driving over a previously drilled hole is avoided. Driving over a previously drilled hole may cause drillings to end up into the drilled hole.

According to an example embodiment, the apparatus 200 is configured to automatically add one or more waypoints. The apparatus 200 may be configured to add one or more waypoints based on information received from other systems used for controlling the drilling rig. For example, the apparatus 200 may be configured to add at least one waypoint in response to receiving information that a drilled hole is to be avoided and/or receiving information from an obstacle control system on infrastructure, boulders or other objects preventing using a planned route.

According to an example embodiment, the first route comprises a first tramming route and the second route comprises a second tramming route. A tramming route may comprise a route for a self-propelled equipment such as a drilling rig.

The apparatus 200 may be configured to calculate the first route and the second route based on one or more parameters. A parameter may comprise, for example, a drilled hole, a hole to be drilled or any other suitable parameter. The one or more parameters may be updated in response to one or more operations performed by the drilling rig. For example, the one or more parameters may be updated in response to finishing a hole in the drill plan.

According to an example embodiment, the apparatus 200 is configured to calculate the first route and the second route in dependence upon contextual information. Contextual information may comprise, for example, historical information such as positions of one or more of drilled holes, or environmental information such as slopes in the drilling site or the like.

According to an example embodiment, the apparatus 200 is configured to calculate the first route and the second route such that the drilling rig does not drive over a previously drilled hole.

Without limiting the scope of the claims, an advantage of calculating the first route and the second route such that the drilling rig does not drive over a previously drilled hole is that less drillings end up into a drilled hole.

According to an example embodiment, the apparatus 200 is configured to present the calculated first route and the calculated second route on a display. The display may be located on the drilling rig or it may be, for example, a display used for remote monitoring.

According to an example embodiment, the apparatus 200 is further configured to select, based on at least one criterion, the calculated first route or the calculated second route. Presentation of the first route may be different from presentation of the second route.

According to an example embodiment, the at least one criterion comprises at least one of the following: a shortest route to the target position, a fastest route to the target position or a route with the least number of required turns.

According to an example embodiment, the apparatus 200 is configured to select the calculated first route or the calculated second route based on a combination of a plurality of criteria. For example, the apparatus 200 may be configured to select shortest route with the least number of required turns or any other suitable combination of criteria.

Without limiting the scope of the claims, an advantage of selecting a shortest route or a fastest route may be that fuel and/or time are saved compared to longer and/or slower routes. An advantage of selecting a route with the least number of turns may be that, for example, if the drilling rig is crawler-mounted, sharp turns make it difficult to control the drilling rig as in sharp turns the crawler may start to dig a hole in the dirt, thereby causing less efficient steering of the drilling rig.

Figure 3:
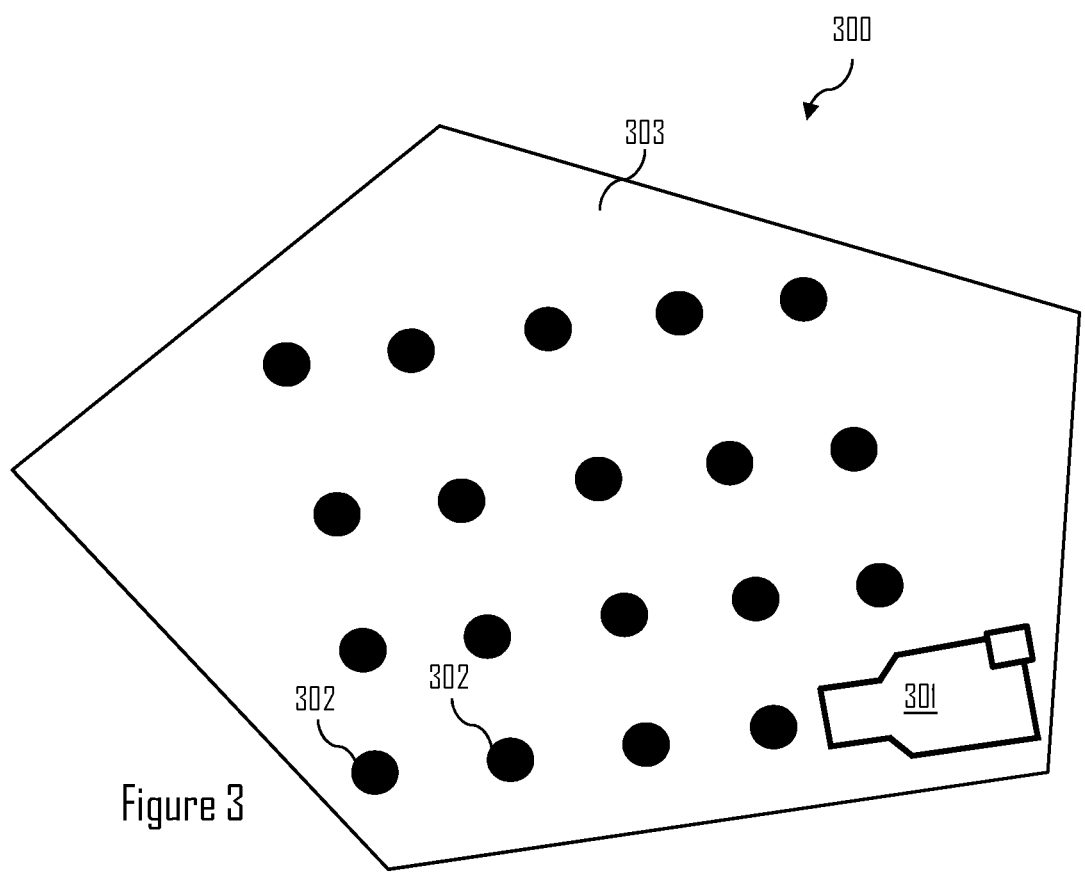
FIG. 3 illustrates an example of a drill plan.

FIG. 3 illustrates an example drill plan 300. The drill plan 300 comprises a plurality of holes 302 to be drilled within a geo-fence area 303. In the example of FIG. 3, a drill hole 302 is associated with geographical coordinates. The drill plan 300 further comprises a representation of a drilling rig 301. In the example of FIG. 3, the drilling rig 301 is associated with a geographical position. The drill plan in the example of FIG. 3 may comprise a digital drill plane presented on a graphical user interface comprised by the apparatus 200 or operatively connected to the apparatus 200.

Figure 4:
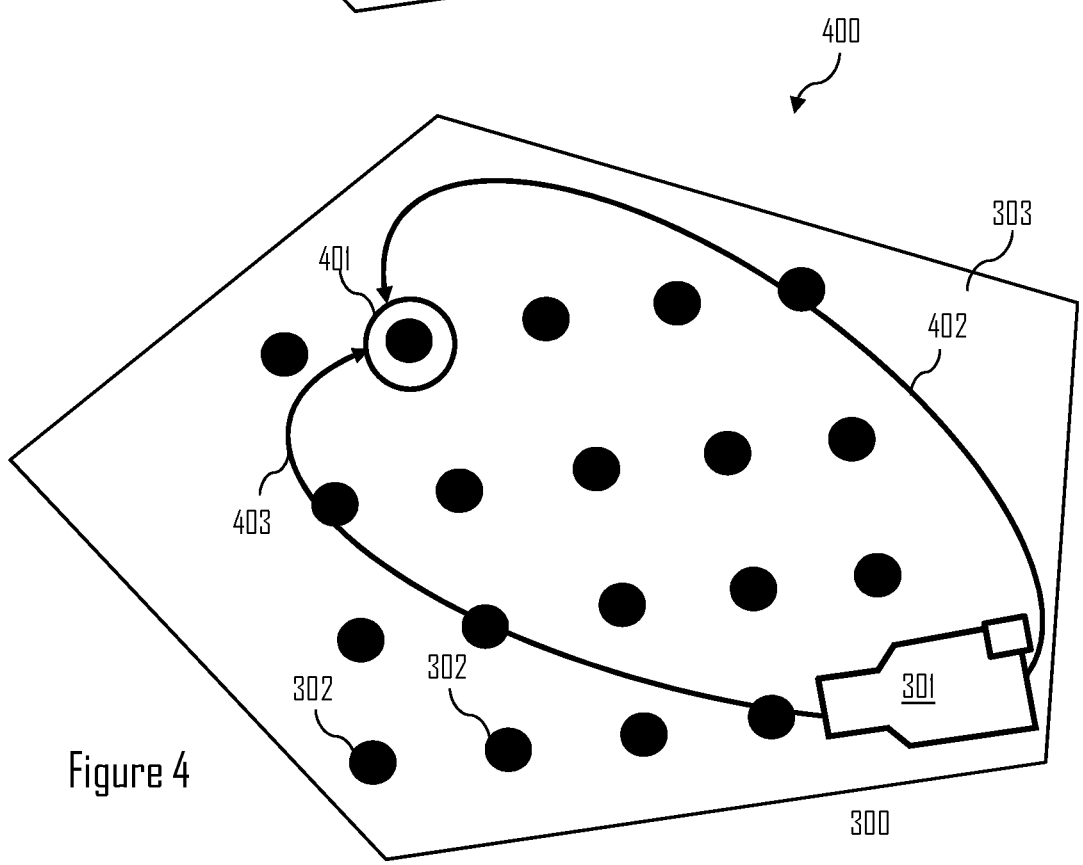
FIG. 4 illustrates another example of a drill plan.

FIG. 4 illustrates an example drill plan 400 comprising a target position 401, a first route 402 and a second route 403. The target position 401 comprises a hole to be drilled. The drill plan may be provided on a graphical user interface comprised by the apparatus 200 or operatively connected to the apparatus 200.

The first route 402 and the second route 403 may be calculated by the apparatus 200. The apparatus 200 is configured to calculate, based on status information relating to the drilling rig 301, the first route 402 according to a first approach type and the second route 403 according to a second approach type to the target position 401. In the example if FIG. 4, the status information comprises a position of the drilling rig 301 and the heading of the drilling rig 301.

In the example of FIG. 4, the first route 402 and the second route 403 to the target position 401 are presented on the drill plan 400. In FIG. 4, the first route 402 comprises a route to the target position by driving the drilling rig in a first direction such as backward and the second route 403 comprises a route to the target position by driving the drilling rig in a second direction such as forward.

The apparatus 200 is configured to select the first route or the second route based on at least one criterion. The at least one criterion may comprise, for example, a shortest route to the target position 401, a fastest route to the target position 401 or a route with the least number of required turns. Alternatively, the apparatus 200 may be configured to suggest the first route or the second route for a user. A selected or suggested route may be visually indicated for the user.

Figure 5:
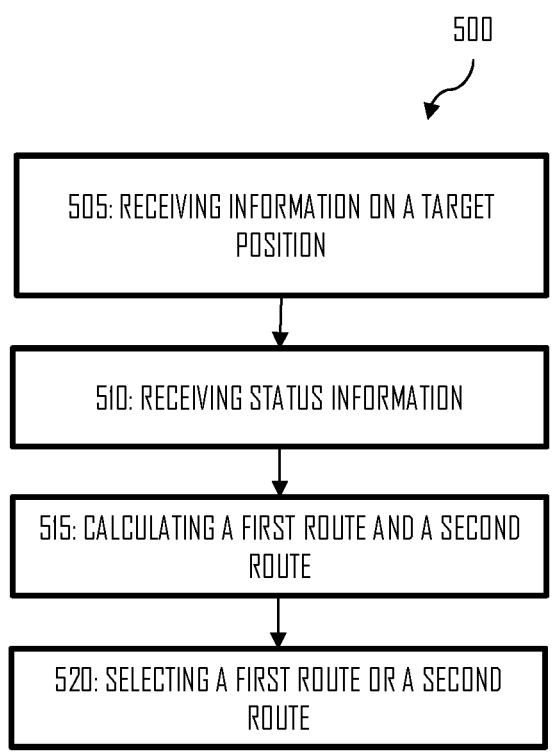
FIG. 5 shows an example method incorporating aspects of examples of the invention.

FIG. 5 illustrates an example method 500 incorporating aspects of the previously disclosed embodiments. More specifically, the example method 500 illustrates selecting a calculated first route or a calculated second route.

The method starts with receiving 505 information on a target position of a drilling rig. A target position of a drilling rig may comprise, for example, a position of a target hole to be drilled.

The method continues with receiving 510 status information relating to the drilling rig. Status information comprises at least one of the following: a position of the drilling rig, a heading of the drilling rig, or positions of one or more previously drilled holes.

The method further continues with calculating 515, based on the status information, at least a first route according to a first approach type and a second route according to a second approach type to the target position. The first approach type may comprise, for example, approaching the target position by driving the drilling rig forward. The second approach type may comprise, for example, approaching the target position by driving the drilling rig backward.

The method further continues with selecting 520, based on at least one criterion, the calculated first route or the calculated second route. The at least one criterion may comprise, for example, a shortest route to the target position, a fastest route to the target position, or a route with the least number of required turns of the drilling rig.

According to an example embodiment, the apparatus 200 comprises means for receiving information on a target position of a drilling rig, means for receiving status information relating to the drilling rig, means for calculating, based on the status information, at least a first route according to a first approach type and a second route according to a second approach type to the target position, and means for selecting, based on at least one criterion, the calculated first route or the calculated second route. According to an example embodiment, the apparatus 200 further comprises means for calculating the first route and the second route such that the drilling rig does not drive over a previously drilled hole and means for presenting the calculated first route and the calculated second route on a display. According to an example embodiment, the apparatus 200 further comprises means for receiving information on a location of the drilling rig. The apparatus 200 may further comprise means for receiving information on a target position in response to a user input.

Without limiting the scope of the claims, an advantage of calculating, based on the status information, a first route according to a first approach type and a second route according to a second approach type is that a suitable approach type may be chosen for different situations.

Without in any way limiting the scope, interpretation, or application of the claims appearing below, a technical effect of one or more of the example embodiments disclosed herein is that efficiency of the drilling rig may be improved by enabling choosing a different approach type in different situations.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor and at least one memory including computer program code, the at least one memory and the computer program code being configured to, with the at least one processor, cause the apparatus at least to:
   receive information on a position of a drilling rig;
   receive information on a target position of the drilling rig;
   receive status information relating to the drilling rig;
   calculate, based on the status information, the position and the target position of the drilling rig, at least a first route according to a first approach type and a second route according to a second approach type to the target position; and
   select, based on at least one criterion, the calculated first route or the calculated second route.

2. The apparatus according to claim 1, wherein the status information includes at least one of the following: a heading of the drilling rig, a drilling area, or positions of one or more previously drilled holes.

3. The apparatus according to claim 1, wherein the first approach type comprises a first driving direction.

4. The apparatus according to claim 3, wherein the second approach type comprises a second driving direction.

5. The apparatus according to claim 4, wherein the first driving direction comprises driving forward and the second driving direction comprises driving backward.

6. The apparatus according to claim 1, wherein the at least one criterion includes at least one of the following: a shortest route to the target position, a fastest route to the target position or a route with the least number of required turns.

7. The apparatus according to claim 1, wherein the apparatus is configured to calculate the first route and the second route such that the drilling rig does not drive over a previously drilled hole.

8. The apparatus according to claim 1, wherein the target position comprises a position of a target hole to be drilled.

9. The apparatus according to claim 1, wherein the apparatus is configured to set a waypoint that is to be included in the calculated first route and the calculated second route.

10. The apparatus according to claim 1, wherein the apparatus is configured to receive information on a desired approach angle for approaching the target position and the apparatus includes means for calculating the first route and the second route in dependence upon the desired approach angle.

11. The apparatus according to claim 1, wherein the first route comprises a first tramming route and the second route comprises a second tramming route.

12. The apparatus according to claim 1, wherein the apparatus is configured to present the calculated first route and the calculated second route on a display.

13. The apparatus according to claim 1, wherein the apparatus is configured to receive information on a target position in response to a user input or in response to determining a target position based on a drill plan.

14. A method comprising:
receiving information on a position of a drilling rig;
receiving information on a target position of the drilling rig;
receiving status information relating to the drilling rig;
calculating, based on the status information, the position and the target position of the drilling rig, at least a first route according to a first approach type and a second route according to a second approach type to the target position; and
selecting, based on at least one criterion, the calculated first route or the calculated second route.

15. A computer program comprising instructions for causing an apparatus to perform at least the following:
receiving information on a position of a drilling rig;
receiving information on a target position of the drilling rig;
receiving status information relating to the drilling rig;
calculating, based on the status information, the position and the target position of the drilling rig, at least a first route according to a first approach type and a second route according to a second approach type to the target position; and
selecting, based on at least one criterion, the calculated first route or the calculated second route.

* * * * *